(12) United States Patent
Baek

(10) Patent No.: US 11,930,238 B2
(45) Date of Patent: Mar. 12, 2024

(54) DISPLAY DEVICE, AND INFRARED TRANSMISSION DEVICE AND CONTROL METHOD THEREFOR

(71) Applicant: LG ELECTRONICS INC., Seoul (KR)

(72) Inventor: Sanghyun Baek, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/778,337

(22) PCT Filed: Nov. 19, 2019

(86) PCT No.: PCT/KR2019/015867
§ 371 (c)(1),
(2) Date: May 19, 2022

(87) PCT Pub. No.: WO2021/100894
PCT Pub. Date: May 27, 2021

(65) Prior Publication Data
US 2023/0012150 A1    Jan. 12, 2023

(51) Int. Cl.
*H04N 21/422*    (2011.01)
(52) U.S. Cl.
CPC . *H04N 21/42221* (2013.01); *H04N 21/42212* (2013.01)
(58) Field of Classification Search
CPC .................. H04N 21/42221; H04N 21/42212
USPC ......................................................... 348/734
See application file for complete search history.

(56) References Cited

U.S. PATENT DOCUMENTS

| 4,856,081 A * | 8/1989 | Smith .................... G08C 19/28 398/112 |
| 5,959,751 A * | 9/1999 | Darbee ................. H03J 1/0025 398/112 |
| 7,711,874 B1 * | 5/2010 | Ilyasov ................. G06F 3/0238 710/1 |
| 2006/0210278 A1 * | 9/2006 | Cregg .................... G08C 23/04 398/107 |
| 2009/0024865 A1 | 1/2009 | Fugaro et al. |
| 2009/0079594 A1 * | 3/2009 | Arling .............. H04N 21/44209 341/22 |

(Continued)

FOREIGN PATENT DOCUMENTS

| KR | 1020050082233 | 8/2005 |
| KR | 20180116085 | 10/2018 |
| KR | 101917844 | 11/2018 |

OTHER PUBLICATIONS

PCT International Application No. PCT/KR2019/015867, International Search Report dated Aug. 13, 2020, 4 pages.

*Primary Examiner* — John W Miller
*Assistant Examiner* — Omer Khalid
(74) *Attorney, Agent, or Firm* — LEE, HONG, DEGERMAN, KANG & WAIMEY

(57) ABSTRACT

Disclosed are a display device, and an infrared transmission device and a control method therefor. The disclosed infrared transmission device: determines whether a repeat event occurs, on the basis of the amount of request data stored in a buffer; and when a repeat event occurs, generates an infrared signal corresponding to the repeat event and transmits the infrared signal to a display device or an external electronic device.

16 Claims, 8 Drawing Sheets

(56) References Cited

U.S. PATENT DOCUMENTS

2011/0197214 A1* 8/2011 Burton ............. H04N 21/44218
348/731
2018/0302661 A1* 10/2018 Ahn ................. H04N 21/42225

* cited by examiner

[FIG. 1]
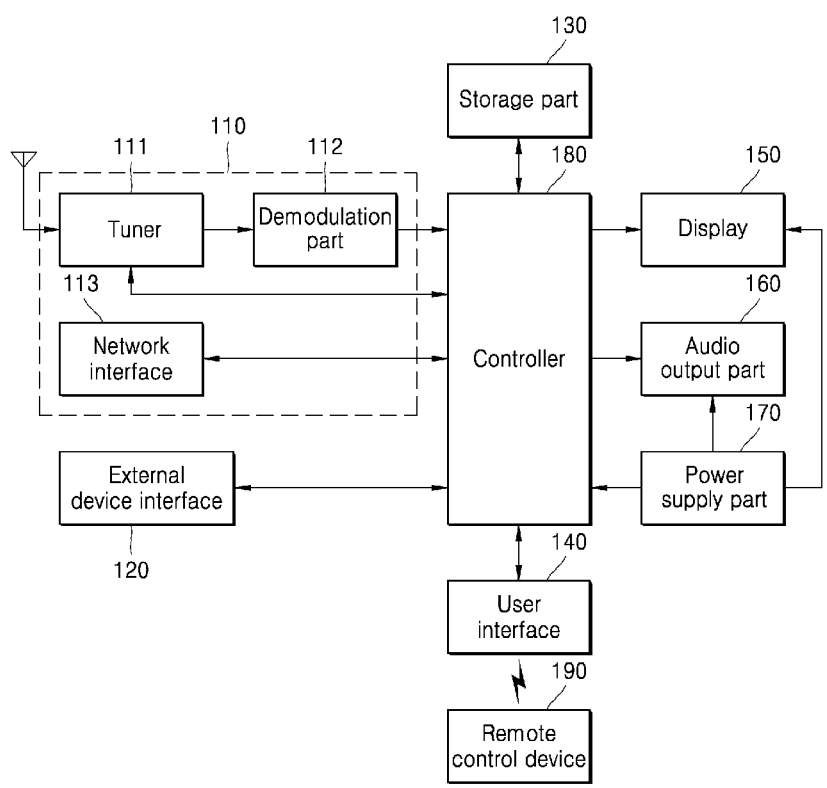

【FIG. 2】
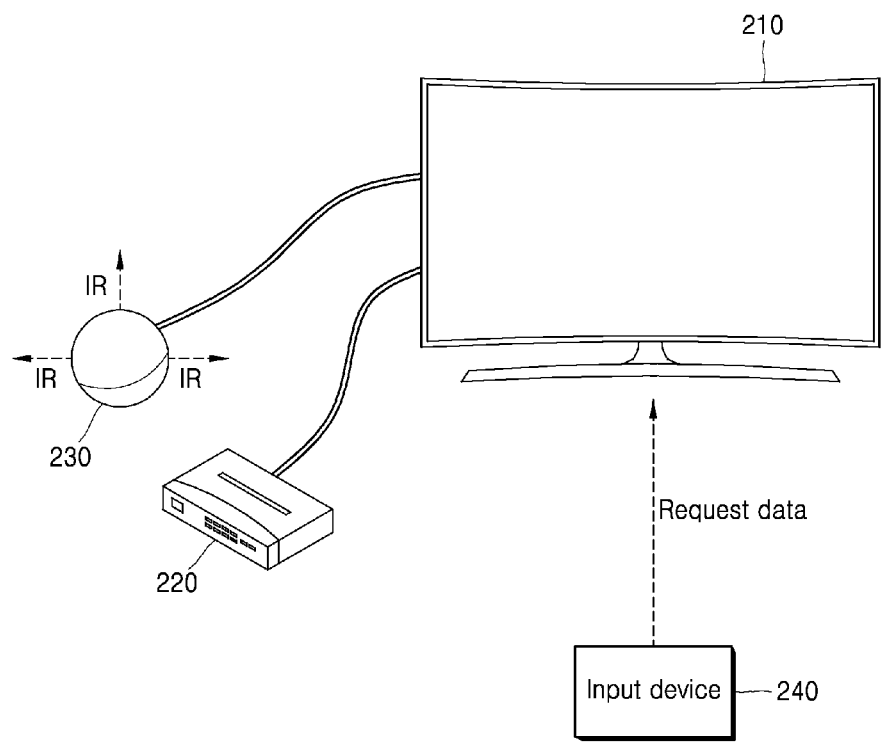

[FIG. 3]
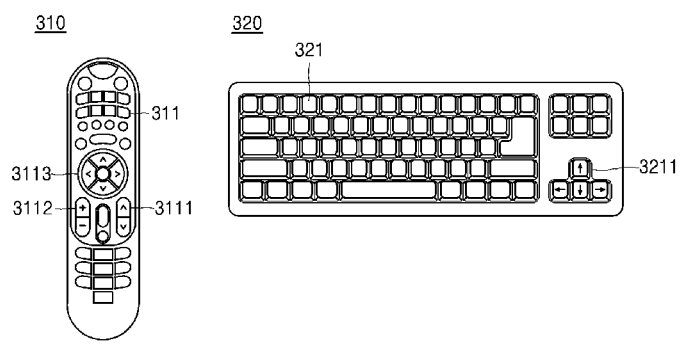
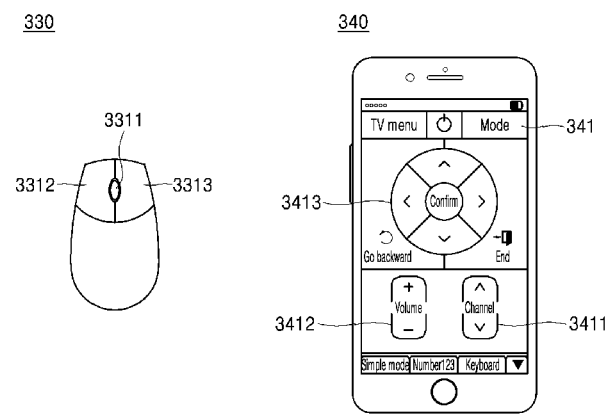

[FIG. 4]
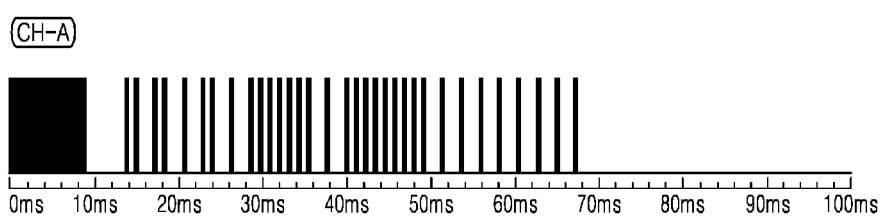
(a)
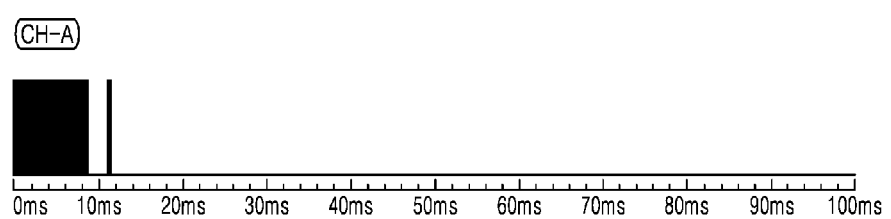
(b)

[FIG. 5]
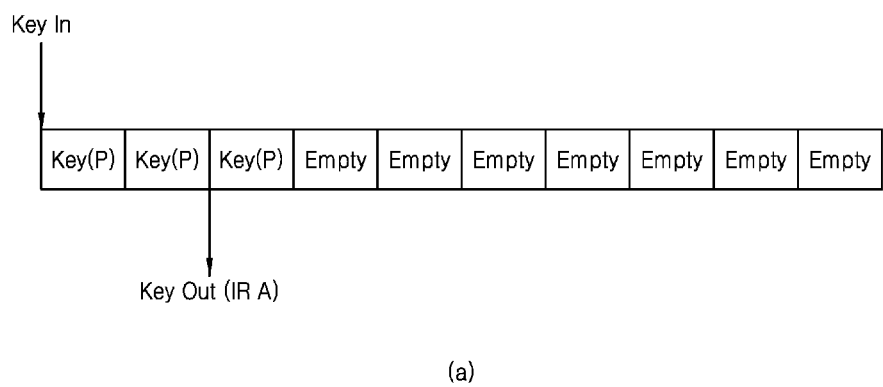
(a)
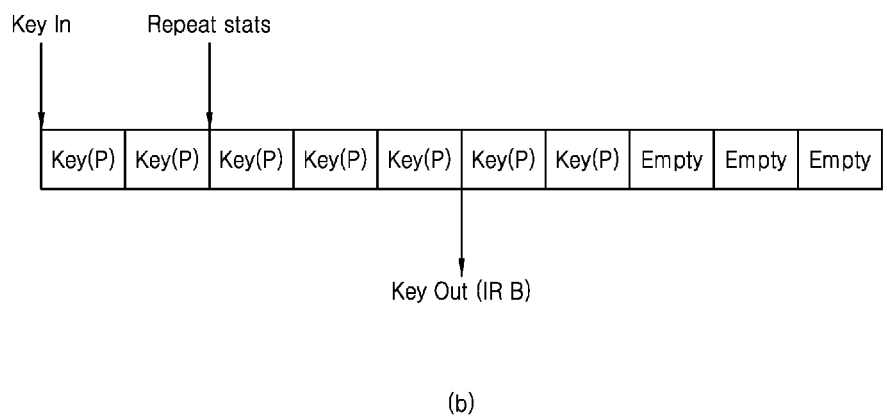
(b)

[FIG. 6]
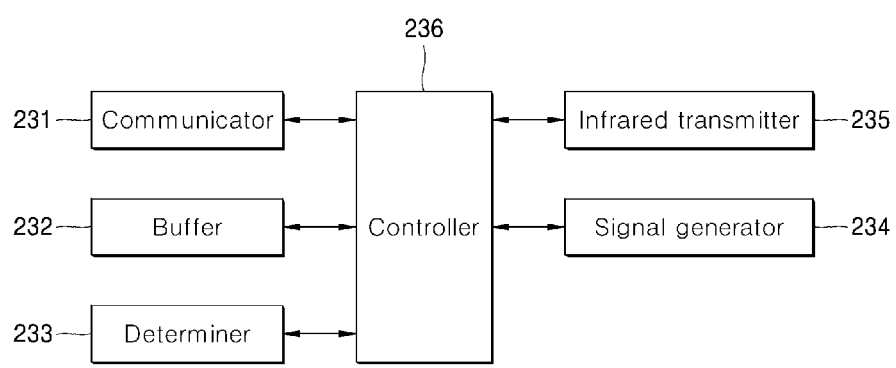

[FIG. 7]
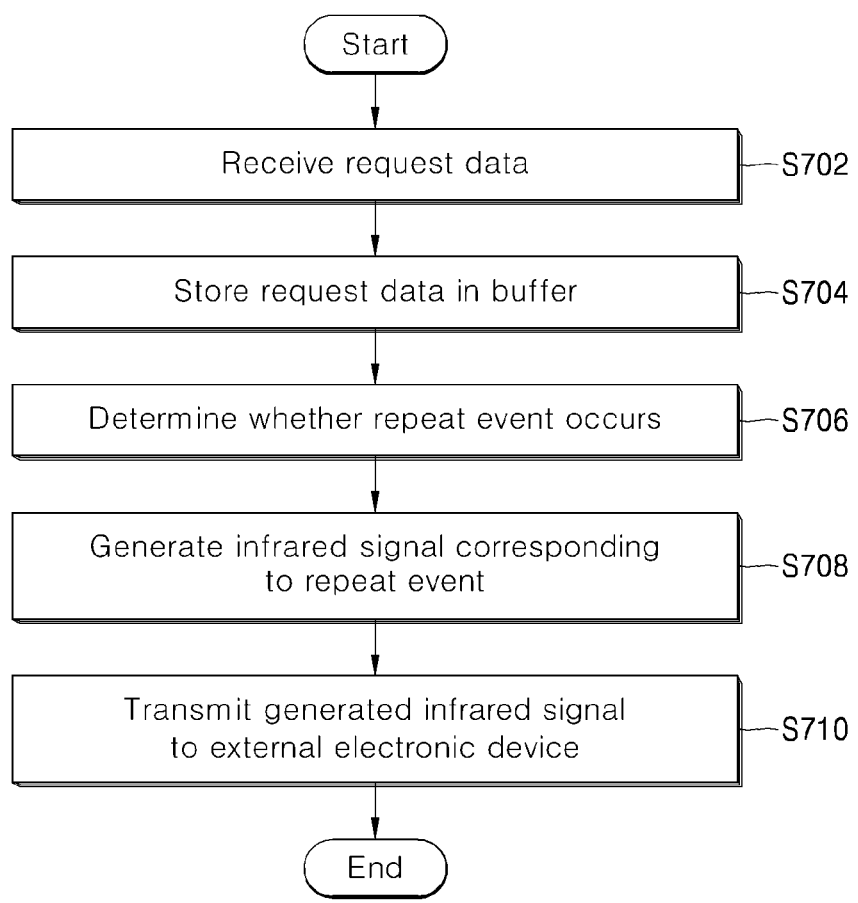

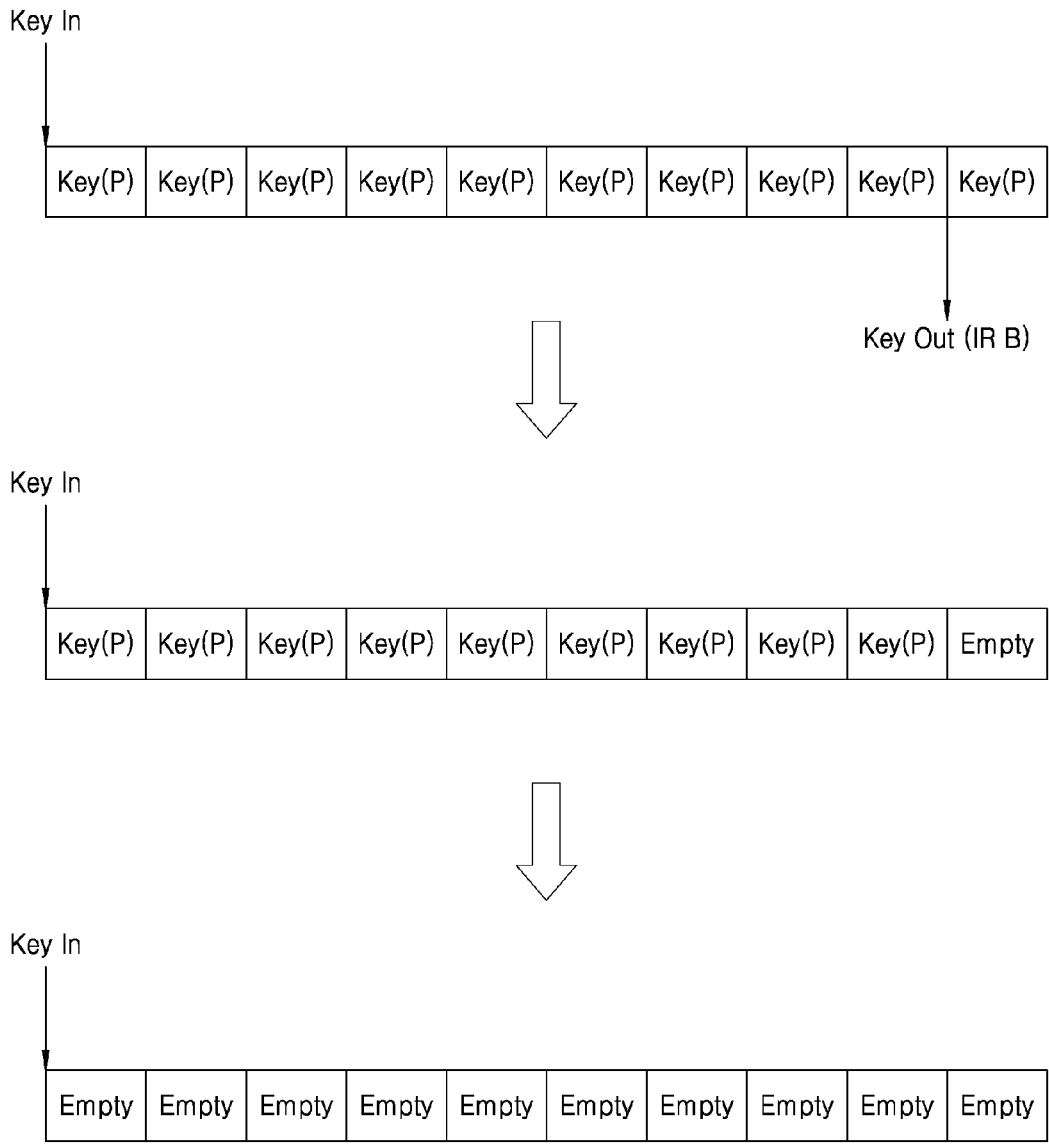
[FIG. 8]

DISPLAY DEVICE, AND INFRARED TRANSMISSION DEVICE AND CONTROL METHOD THEREFOR

CROSS-REFERENCE TO RELATED APPLICATIONS

This application is the National Stage filing under 35 U.S.C. 371 of International Application No. PCT/KR2019/015867, filed on Nov. 19, 2019, the contents of which are all incorporated by reference herein in their entirety.

TECHNICAL FIELD

The present disclosure relates to an infrared transmission device and a control method therefor, and a display device that allow various types of input devices to control the display device or an external electronic device connecting to the display device.

BACKGROUND ART

Display devices have the function of providing images watched by a user. The user can watch broadcast content through a display device. The display device provides the broadcast content selected by the user among broadcast signals transmitted by a broadcasting station, and the broadcast image/content is displayed on a display. Televisions are a typical example of the display device.

The display device connects to an external electronic device, and interlocks with the external electronic device to perform a specific operation. The external electronic device includes a set-top box, an external speaker and the like.

Remote controllers can be used to control the operations of the display device and the external electronic device. Ordinarily, the remote controller controls the display device and the external electronic device by using an infrared signal.

In this case, a remote controller exclusive for controlling the display device, and a remote controller exclusive for controlling the external electronic device need have to be used respectively. A user can feel inconvenient because both the remote controller exclusive for the display device and the external electronic device need to be used to control the display device and the external electronic device.

To solve the problem, an infrared transmission device is required. The infrared transmission device converts request data received by a single remote controller into infrared signals and transmits the infrared signals to the external electronic device. Thus, the user can control both the display device and the external electronic device with a single remote controller.

However, an infrared transmission device of the related art cannot process a repeat event received by a single remote controller. That is, in the repeat event where the user continues to press a certain button, the infrared transmission device of the related art cannot process the repeat event accurately.

DESCRIPTION OF INVENTION

Technical Problems

One objective of the present disclosure is to provide an infrared transmission device and a control method therefor, and a display device that can process a repeat event.

Another objective of the present disclosure is to provide an infrared transmission device and a control method therefor, and a display device that can process a repeat event accurately even if various types of input devices are used.

Aspects according to the present disclosure are not limited to the above ones, and other aspects and advantages that are not mentioned above can be clearly understood from the following description and can be more clearly understood from the embodiments set forth herein. Additionally, the aspects and advantages in the present disclosure can be realized via means and combinations thereof that are described in the appended claims.

Technical Solutions

An infrared transmission device and a control method therefor in one embodiment involve determining whether a repeat event occurs based on the amount of request data stored in a buffer, generating an infrared signal corresponding to the repeat event when the repeat event occurs, and transmitting the infrared signal to a display device or an external electronic device.

The infrared transmission device of one embodiment includes a communicator receiving request data generated by an input device with a plurality of buttons, a buffer storing the request data, a determiner determining whether a repeat event occurs, based on an amount of the request data stored in the buffer, and a signal generator generating an infrared signal corresponding to the repeat event when the repeat event occurs, and an infrared transmitter transmitting the infrared signal to an external electronic device, and the repeat event is an event in which a user continues to press a certain button.

The display device of one embodiment includes a communicator receiving request data generated by an input device with a plurality of buttons, a buffer storing the request data, a determiner determining whether a repeat event occurs, based on an amount of the request data stored in the buffer, a signal generator generating an infrared signal corresponding to the repeat event when the repeat event occurs, and an infrared transmitter transmitting the infrared signal to an external electronic device, and the repeat event is an event in which a user continues to press a certain button.

A control method for an infrared transmission device of one embodiment includes receiving request data, generated by an input device with a plurality of buttons, by a communicator, storing the request data by a buffer, determining whether a repeat event occurs by a determiner, based on an amount of the request data stored in the buffer, generating an infrared signal corresponding to the repeat event by a signal generator when the repeat event occurs, and transmitting the infrared signal by an infrared transmitter to an external electronic device, and the repeat event is an event in which a user continues to press a certain button.

Advantageous Effects

According to the present disclosure, an infrared transmission device can process a repeat event.

According to the present disclosure, the infrared transmission device can process a repeat event accurately even if various types of input devices are used.

Specific effects are described along with the above-described effects in the section of Detailed Description.

BRIEF DESCRIPTION OF DRAWINGS

FIG. 1 is a view showing a schematic configuration of a digital device of one embodiment.

FIG. 2 is a view showing a schematic configuration of a network system of one embodiment.

FIG. 3 is a view showing examples of an input device in the present disclosure.

FIGS. 4 and 5 are views for describing a concept according to the present disclosure.

FIG. 6 is a view showing a schematic view of an infrared transmission device of one embodiment.

FIG. 7 is a flow chart showing a control method for the infrared transmission device for processing a repeat event, in one embodiment.

FIG. 8 is a view showing the concept of an operation of processing a repeat event in one embodiment.

DETAILED DESCRIPTION OF EXEMPLARY EMBODIMENTS

The above-described aspects, features and advantages are specifically described hereunder with reference to the accompanying drawings such that one having ordinary skill in the art to which the present disclosure pertains can embody the technical spirit of the disclosure easily. In the disclosure, detailed description of known technologies in relation to the disclosure is omitted if it is deemed to make the gist of the disclosure unnecessarily vague. Below, preferred embodiments according to the disclosure are specifically described with reference to the accompanying drawings. In the drawings, identical reference numerals can denote identical or similar components.

The terms "first", "second" and the like are used herein only to distinguish one component from another component. Thus, the components should not be limited by the terms. Certainly, a first component can be a second component unless stated to the contrary.

When any one component is described as being "connected", "coupled", or "connected" to another component, any one component can be directly connected or coupled to another component, but an additional component can be "interposed" between the two components or the two components can be "connected", "coupled", or "connected" by an additional component.

Throughout the disclosure, each component can be provide as a single one or a plurality of ones, unless stated to the contrary.

In the disclosure, singular forms include plural forms as well, unless explicitly indicated otherwise. It is to be understood that the terms such as "comprise" or "include" and the like, when used in this disclosure, are not interpreted as necessarily including stated components or steps, but can be interpreted as excluding some of the stated components or steps or as further including additional components or steps.

Throughout the disclosure, the terms "A and/or B" as used herein can denote A, B or A and B, and the terms "C to D" can denote C or greater and D or less, unless stated to the contrary.

As an intelligent display device in which a computer assist function is added to a broadcast reception function, for example, the display device in the present disclosure can perform an Internet function and the like as well as a broadcast reception function, and be equipped with an interface that can be used more readily than a handwriting-based input device, a touch screen or a space remote controller and the like. Assisted with a wired or wireless Internet function, the display device can access the Internet and a computer, and perform the functions of e-mailing, web browsing, banking, or gaming and the like. Standardized and widely-used OAs can be used for the above functions.

In the display device according to the disclosure, various types of applications can be freely added onto or removed from a widely used OS kernel, for example, thereby enabling the display device to perform various user-friendly functions. Specifically, the display device can include a network display device, an HBB display device, a smart display device, an LED display device, an OLED display device and the like, and in some cases, can be applied to a mobile terminal.

The mobile terminal in the present disclosure may include mobile phones, smart phones, laptop computers, digital broadcast terminals, personal digital assistants (PDAs), portable multimedia players (PMPs), navigators, slate PCs, tablet PCs, ultrabooks, wearable devices (e.g., watch-type terminals (smart watches), glass-type terminals (smart glasses), and head mounted displays (HMDs)), and the like.

However, one having ordinary skill in the art can understand that the configurations of the embodiments in the disclosure can be applied to fixed terminals such as a digital display device, a desktop computer, a digital signage and the like, except that the configurations are applied only to mobile terminals.

Hereafter, a display device and a control method for the same in several embodiments are described.

FIG. 1 is a view showing a schematic configuration of a digital device of one embodiment.

Referring to FIG. 1, the digital device 100 may include a broadcast reception part 110, an external device interface 120, a storage part 130, a user interface 140, a display 150, an audio output part 160, a power supply part 170, and a controller 180.

The broadcast reception part 110 may include a tuner 111, a demodulation part 112, and a network interface 113. However, in some cases, the broadcast reception part 110 may include the tuner 111 and the demodulation part 112 and exclude the network interface 113, or vice versa.

The broadcast reception part 110 may include a multiplexer, though not illustrated. In this case, the multiplexer may multiplex a signal demodulated by the demodulation part 112, and a signal received through the network interface 113. Besides, the broadcast reception part 110 may also include a demultiplexer, though not illustrated. The demultiplexer may demultiplex multiplexed signals, or multiplex a signal demodulated by the demodulation part 112 or a signal received through the network interface 113.

The tuner 111 tunes a specific radio frequency (RF) broadcast signal. The specific RF broadcast signal corresponds to a channel selected by a user or all pre-stored channels. Additionally, the tuner 111 converts the RF broadcast signal into an intermediate frequency (IF) signal or a baseband signal.

For example, the tuner 111 converts an RF broadcast signal as a digital broadcast signal into a digital IF (DIF) signal, and converts an RF broadcast signal as an analogue broadcast signal into an analogue baseband image or a voice signal (CVBS/SIF). That is, the tuner 111 may process both the digital broadcast signal and the analogue broadcast signal. The analogue baseband image or the voice signal (CVBS/SIF) output from the tuner 111 may be directly input to the controller 180.

Further, the tuner 111 may receive an RF broadcast signal of a single carrier or a multiple carrier. The tuner 111 may consecutively tune and receive RF broadcast signals of all broadcast channels that are stored using a channel memory function, and convert the tuned and received RF broadcast signals into IF signals or baseband signals.

The demodulation part 112 may receive and demodulate the digital IF signals converted by the tuner 111, and may perform channel decoding and the like. To this end, the demodulation part 112 may be provided with a Trellis decoder, a de-interleaver, a Reed-Solomon decoder and the like, or provided with a convolution decoder, a de-interleaver, a Reed-Solomon decoder and the like.

The demodulation part 112 may output a stream signal TS after performing demodulation and channel decoding. In this case, the stream signal may be a signal where an image signal, a voice signal or a data signal is multiplexed. In an example, the stream signal may be an MPEG-2 transport stream (TS) where an image signal of the MPEG-2 standard, a voice signal of the Dolby AC-3 standard, and the like are multiplexed.

The stream signal output by the demodulation part 112 may be input to the controller 180. The controller 180 may control demultiplexing, image/voice signal processing and the like, and control output of an image through the display 150 and output of a voice through the audio output part 160.

The external device interface 120 provides an environment for interface between the digital device 100 and various types of external devices.

The external device interface 120 may connect to an external device and the like such as a digital versatile disk (DVD), Blu-ray, a game device, a camera, a camcorder, a computer (a lap top), a tablet PC, a smart phone, a Bluetooth device, Cloud and the like in a wired/wireless manner. The external device interface 120 delivers data signals including an image, a video, a voice and the like that are input through the external device connecting to the external device interface 120, to the controller 180. The controller 180 may control processed data signals such as the image, the video, the voice and the like, such that the processed data signals are output to the external device. To this end, the external device interface 120 may further include an A/V input/output part (not illustrated) or a wireless communicator (not illustrated).

The A/V input/output part may include a USB terminal, a Composite Video Banking Sync (CVBS) terminal, a component terminal, an S-video terminal (analogue), a Digital Visual Interface (DVI) terminal, a High Definition Multimedia Interface (HDMI) terminal, an RGB terminal, a D-SUB terminal and the like, to input an image signal and a voice signal of the external device to the digital device 100.

The wireless communicator may perform short-range wireless communication with another digital device. The digital device 100, for example, may make a network connection to another digital device, based on a communication protocol such as Bluetooth, Radio Frequency Identification (RFID), Infrared Data Association (IrDA), ultra wideband (UWB), ZigBee, Digital Living Network Alliance (DLNA) and the like.

Additionally, the external device interface 120 makes access through a set-top box (STB) and at least one of the above-mentioned various terminals, and may perform an input/output operation along with the set-top box.

Further, the external device interface 120 may receive an application or an application list in an adjacent external device, and deliver the application or the application list to the controller 180 or the storage part 130.

The network interface 113 provides an interface for connecting the digital device 100 to a wired/wireless network. The network interface 113 may be provided with an Ethernet terminal and the like, for a connection with a wired network, and may use communication standards and the like such as Wireless LAN (WLAN), Wi-Fi, wireless broadband (WiBro), World Interoperability for Microwave Access (Wimax), High Speed Downlink Packet Access (HSDPA) and the like, for a connection with a wireless network.

The network interface 113 may transmit data to another digital device, and receive data from another digital device, through its connected network or another network linked to its connected network. In particular, the network interface 113 may transmit a portion of content data stored in the digital device 100 to a selected digital device out of other pre-registered digital devices.

Additionally, the network interface 113 may access a predetermined web page through its connected network or another network linked to its connected network. That is, the network interface 113 may access the predetermined web page through the network, and transmit data to and receive data from a corresponding server. Besides, the network interface 113 may receive content or data provided by a content provider or a network operator. That is, the network interface 113 may receive contents such as a movie, an advertisement, a game, a VOD, a broadcast signal and the like, which are provided by the content provider or the network provider through the network, and information thereon. Further, the network interface 113 may receive firmware update information and update file provided by the network operator. Furthermore, the network interface 113 may transmit data to the Internet or the content provider or the network operator.

The network interface 113 may select and receive a desired application among open applications through the network.

Programs for processing and controlling each signal in the controller 180 may be stored in the storage part 130, and the signal-processed image, voice, or data signal may be stored in the storage part 130.

An image, a voice or a data signal, input from the external device interface 120 or the network interface 113, may be temporarily stored in the storage part 130. Information on predetermined broadcast channels may be stored in the storage part 130, based on the channel memory function.

An application or an application list, input from the external device interface 120 or a network interface 330, may be stored in the storage part 130.

Various platforms described below may also be stored in the storage part 130.

The storage part 130, for example, may include a storage medium of at least one of a flash memory-type memory, a hard disk-type memory, a multimedia card micro-type memory, a card-type memory (e.g., an SD or XD memory and the like), RAM, and ROM (EEPROM and the like). The digital device 100 may reproduce content files (a video file, a still image file, a music file, a document file, an application file and the like) stored in the storage part 130 and provide the reproduced content files to the user.

The storage part 130 may be included in the controller 130 or may separate from the controller 180.

The user input interface 140 delivers a signal input by the user to the controller 180 or delivers a signal of the controller 180 to the user.

For example, the user input interface 140 may connect to a remote control device 190, using a variety of communication methods such as an RF communication method, an infrared (IR) communication method and the like. The user input interface 140 may receive and process control signals for powering on/off, channel selection, display setting and the like that are transmitted by the remote control device 190, or transmit a control signal of the controller 180 to the remote control device 500. Additionally, the user input interface 140 may deliver control signals input from a power key, a channel key, a volume key, and a local key (not illustrated) such as a set value and the like, to the controller 180.

The user input interface 140 may deliver a control signal input by a sensing part (not illustrated) that senses a gesture of the user to the controller 180, or transmit a signal of the controller 180 to the sensing part (not illustrated). The sensing part (not illustrated) may include a touch sensor, a voice sensor, a position sensor, a motion sensor and the like.

The controller 180 may demultiplex a stream input through the tuner 111, the demodulation part 112, or the external device interface 120 or process demultiplexed signals, to generate and output a signal for outputting an image or a voice.

An image signal processed by the controller 180 may be input to the display 150, and displayed as an image corresponding to the image signal. Additionally, the image signal processed by the controller 180 may be input to an external output device through the external device interface 120.

A voice signal processed by the controller 180 may be output acoustically to the audio output part 160. Further, a voice signal processed by the controller 180 may be input to an external output device through the external device interface 120.

The controller 180 may include a demultiplexer, an image processing part and the like.

The controller 180 may control operations of the digital device 100 entirely. For example, the controller 180 may control the tuner 111 such that the tuner 111 tunes RF broadcast corresponding to a channel selected by the user or a pre-stored channel.

The controller 180 may control the digital device 100, using a user instruction input through the user input interface 140 or an internal program. In particular, the controller 180 may access a network and download an application or an application list desired by the user in the digital device 100.

For example, the controller 180 controls the tuner 111 such that a signal of a channel selected according to an instruction to select a predetermined channel, which is received through the user input interface 140, is input. Then the controller 180 processes image, voice or data signals of the selected channel. The controller 180 controls the display 150 or the audio output part 160 such that the display 150 or the audio output part 160 outputs information on the channel selected by the user and the like together with the processed image or voice signals.

In another example, the controller 180 controls the display 150 or the audio output part 160 such that the display 150 or the audio output part 160 outputs an image signal or a voice signal from an external device according to an instruction to reproduce an external device image, which is received through the user input interface 140.

Additionally, the controller 180 may control the display 150 such that the display 150 displays an image. For example, the controller 180 controls the display 150 such that the display 150 displays a broadcast image input through the tuner 111, or an externally input image input through the external device interface 120, or an image input through the network interface, or an image stored in the storage part 130. In this case, the image displayed on the display 150 may be a still image or a moving image, and a 2D image or a 3D image.

Further, the controller 180 may control the display 150 such that the display 150 reproduces content. In this case, the content may be content stored in the digital device 100, received broadcast content, or externally input content input from the outside. The content may be at least one of a broadcast image, an externally input image, an audio file, a still image, an accessed web screen, and a document file.

When entering the application library, the controller 180 may control the display such that the display displays an application or an application list that can be downloaded from the internal or external network of the digital device 100.

The controller 180 may control . . . such that an application downloaded from an external network is installed and driven, together with various types of user interfaces. Furthermore, the controller 180 may control the display 150 such that the display 150 displays an image in relation to an application that is executed as the user selects the application.

Though not illustrated, a channel browsing processing part that produces a thumbnail image corresponding to a channel signal or an externally input signal can be further provided.

The channel browsing processing part may receive a stream signal TS output by a demodulation part 320 or a stream signal output by the external device interface 120 and the like, extract an image from the input stream signal, and produce a thumbnail image. The produced thumbnail image may be input to the controller 180 as it is, or may be encoded and input to the controller 180. The produced thumbnail image may also be encoded as a stream and input to the controller 180. The controller 180 may display a thumbnail list that includes a plurality of thumbnail images, using the input thumbnail image, on the display 150. The thumbnail images in the thumbnail list may be updated one by one or at the same time. Accordingly, the user may easily know about contents of a plurality of broadcast channels.

The display 150 converts an image signal, a data signal and an OSD signal that are processed by the controller 180, or an image signal, a data signal and the like that are received from the external device interface 120 respectively into RGB signals, and generates a driving signal.

The display 150 may be a PDP display, an LCD display, an OLED display, a flexible display, a 3D display, and the like.

The display 150 may be embodied as a touch screen and used as an input device in addition to an output device.

The audio output part 160 receives a signal processed by the controller 180 as a voice, e.g., a stereo signal, a 3.1 channel signal or a 5.1 channel signal, and outputs the signal as a voice. The voice output part 160 may be embodied as various types of speakers.

The digital device 100, as described above, may be further provided with a sensing part (not illustrated) including at least one of a touch sensor, a voice sensor, a position sensor and a motion sensor, to sense a gesture of the user. A signal sensed by the sensing part (not illustrated) may be delivered to the controller 3180 through the user input interface 140.

A capturing part (not illustrated) that captures an image of a user may be further provided. Image information captured by the capturing part (not illustrated) may be input to the controller 180.

The controller 180 may use an image captured by the capturing part (not illustrated) or a signal sensed by the sensing part (not illustrated) respectively or in combination, to sense a gesture of the user.

The power supply part 170 supplies power to the components of the digital device 100. In particular, the power supply part 170 may supply power to the controller 180 capable of being embodied as a system on chip (SoC), the display 150 for an image display, and the audio output part 160 for an audio output.

To this end, the power supply part 170 may be provided with a converter (not illustrated) that converts AC power into DC power. When the display 150 is embodied as a liquid crystal panel provided with a plurality of backlight lamps, the power supply part 170 may be further provided with an inverter (not illustrated) capable of performing a pulse width modulation (PWM) operation, for luminance variations or dimming driving.

The digital device 100 may be a digital broadcast receiver that can process digital broadcast signals based on a fixed or mobile ATSC method or a DVB method.

Besides, the digital device 100 may exclude some of the components that are illustrated, or further include components that are not illustrated, if necessary. The digital device 100 may receive content through the network interface or the external device interface and reproduce the content, without including the tuner and the demodulation part.

Hereafter, an electronic device of one embodiment and a control method for the same are described with reference to the above descriptions.

FIG. 2 is a view showing a schematic configuration of a network system of one embodiment.

The network system 200 in FIG. 2 may be a small-scale network system that is ordinarily used at home and the like, and include a display device 210, an external electronic device 220, an infrared transmission device 230 and an input device 240.

The display device 210 may be a TV, for example, provide video services to the user and provide a variety of services to the user through a plurality of software programs. To execute the plurality of software programs, the display device 210 may communicably connect to a plurality of external servers through the Internet and the like.

The external electronic device 220 may interlock with the display device 210, to provide a variety of services.

In an example, the external electronic device 220 may be a set-top box, an external speaker, and the like. The set-top box is a device that provides a two-way service or a video-on-demand service to the display device 210. The external speaker is a device that outputs an audio signal of a video executed by the display device 210.

The display device 210 and the external electronic device 220 may be respectively controlled by a remote controller exclusive for each of them. However, in the disclosure, the external electronic device 220 and the display device 210 may be controlled by a single input device 240. In this case, the infrared transmission device 230 may be required.

The infrared transmission device 230 may also be referred to as an infrared blaster (IR Blaster), and may be device that converts request data (request signals) generated by the input device 230 into infrared signals, and transmits the converted infrared signals to a device to be controlled.

In this case, the input device 240 may transmit the request data to the display device 210, the display device 210 may transmit the request data to the infrared transmission device 230, and the infrared transmission device 230 may emit the infrared signals. The external electronic device 220 may receive the emitted infrared signals, and based on the received infrared signals, control a certain operation.

Further, the display device 210 and the infrared transmission device 230 may communicably connect using wired/wireless communication technologies.

The input device 240 may be an integrative remote control device that can control both the display device 210 and the external electronic device 220. In an example, the input device 240 may be a terminal device and the like such as a remote controller, a keyboard, a mouse, a smartphone and the like FIG. 3 shows examples of the input device 240.

The remote controller 310 may be an ordinary remote controller rather than a remote controller exclusive for the display device 210, and transmit request data to the display device 210 using infrared signals.

The remote controller 310 includes a plurality of buttons 311. The buttons 311 are physical buttons. The user may press or release the buttons 311. Based on the motions, the remote controller 310 may transmit request data.

In particular, the plurality of buttons 311 may include two or more repeat buttons. The repeat buttons are used to carry out a repeat event. The repeat event corresponds to an event in which the user continues to press a certain button. In an example, the two or more repeat buttons may include a channel button 3111, a volume button 3112, and four direction key buttons 3113.

The keyboard 320 transmits request data to the display device 210, based on wired or wireless USB communication.

The key board 320 includes a plurality of buttons 321. The buttons 321 are physical buttons. The user may press or release the buttons 321. Based on the motions, the keyboard 320 may transmit request data.

In particular, the plurality of buttons 321 may include two or more repeat buttons. In an example, the two or more repeat buttons may include four direction key buttons 3211.

The mouse 330 transmits request data to the display device 210, based on wired or wireless USB communication.

The mouse 330 includes a plurality of buttons. The buttons are physical buttons. In particular, the plurality of buttons may include two or more repeat buttons. In an example, the two or more repeat buttons may include a wheel button 3311, a left button 3312 and a right button 3313. The user may press or release the left and right buttons 3312, 3313, and move up or down the wheel button 3311, and based on the motions, transmit request data.

A terminal device 340 communicably connects to the display device 210, using near field communication technologies and the like. The terminal device 340 is a device including a display, and a plurality of virtual buttons 341 may be displayed in/on the display.

The plurality of virtual buttons 341 may include two or more virtual repeat buttons 341. In an example, the two or more virtual repeat buttons 342 may include a virtual channel button, a virtual volume button, and four virtual direction key buttons.

The infrared input device 230 may generate an infrared signal corresponding to a repeat event, based on the request data transmitted by the input device 240, and transmit the generated infrared signal to the external electronic device 220.

Hereafter, the process in which the external electronic device 220 generates and transmits an infrared signal corresponding to a repeat event is specifically described. In this case, suppose that the input device 240 is a remote controller. However, the input device 240 is not limited.

FIG. 4 is a view for describing a concept of processing a repeat event with an exclusive remote controller in the related art.

In the related art, a display device and a remote controller exclusive for the display device connect using Bluetooth communication technologies, and the user presses or releases a button of the exclusive remote controller. In this case, the exclusive remote controller transmits request data, based on the user's motion.

When the user presses a certain repeat button among the buttons of the exclusive remote controller for a short period of time (a normal state), the exclusive remote controller generates infrared signal A in FIG. 4(a). Additionally, when the user presses a certain repeat button of the exclusive remote controller for a long period of time (a repeat state), the exclusive remote controller generates infrared signal B in FIG. 4(b). In this case, a length of the infrared signal in the repeat state is less than a length of the infrared signal in the normal state.

Since waveforms of an infrared signal to be generated differ depending on a state in which a repeat button is pressed (a normal state or a repeat state), the state in which a repeat button is pressed needs to be specified. In the case of an exclusive remote controller, an exclusive software program may be used to know about the state in which a repeat button is pressed. Accordingly, an infrared signal appropriate for a certain state may be generated.

Referring to FIG. 5(a), when the user presses a repeat button for a short period of time, an exclusive remote controller stores request data corresponding to the input of the button (Key In) in a buffer, and then generates an infrared signal consecutively (Key Out), in an example. That is, a certain period of time is spent until the input of the button is generated, the request data corresponding to the input of the button are stored in the buffer, and then infrared signal A is generated.

In this case, a time interval at which request data are input to the buffer on a regular basis may be less than processing time for generating an infrared signal. For example, standby time for generating an infrared signal (i.e., a time interval at which request data are input on a regular basis), corresponding to an input of a button, is 50 ms, and processing time for generating an infrared signal is 216 ms.

Additionally, referring to FIG. 5(b), when the user presses a repeat button for a long period of time, request data corresponding to an input of a button continue to be stored in the buffer while infrared signals are generated, and . . . enters a repeat state. An exclusive remote controller generates infrared signal B.

FIG. 6 is a view showing a schematic view of an infrared transmission device 230 of one embodiment.

Referring to FIG. 6, the infrared transmission device 230 includes a communicator 231, a buffer 232, a determiner 233, a signal generator 234, an infrared transmitter 235, and a controller 256.

The communicator 231 communicably connects to the display device 210. Based on the communication connection, the communicator 231 receives request data transmitted by the input device 240. Alternatively, the input device 240 may receive request data directly.

The communicator 231 communicably connects to the display device 210, based on a wired or wireless communication method.

In an example, the wired communication method may involve a communication method based on HDMI including an HDMI interface.

In another example, the wireless communication method may involve short-range wireless communication methods. The short-range wireless communication methods may include Bluetooth, Wireless Fidelity (Wi-Fi), Radio Frequency Identification (RFID), Infrared Data Association (IrDA), ZigBee, Near Field Communication (NFC), and the like.

The input device 240, as mentioned above, may be an integrative remote control device that can control both the display device 210 and the external electronic device 220. That is, the input device 240 may be a terminal device and the like such as a remote controller, a keyboard, a mouse, a smartphone and the like that are based on infrared light.

The buffer 232 includes a plurality of buffer cells, and stores request data transmitted by the input device 240. In an example, the buffer 232 may be a first-in first-out (FIFO) buffer.

Based on the request data stored in the buffer 232, the determiner 233 determines the sort of an infrared signal corresponding to the request data.

In particular, the determiner 233 may determine whether a repeat event occurs, based on the amount of the request data stored in the buffer.

In one embodiment, the determiner 233 may determine that a repeat event occurs, when request data are stored in all the plurality of buffer cells included in the buffer 232. In this case, the repeat event may correspond to an event in which the user continues to press a certain button.

The signal generator 234 generates an infrared signal corresponding to the sort of a determined infrared signal.

In particular, when a repeat event occurs, the signal generator 234 may generate an infrared signal corresponding to the repeat event.

The infrared transmitter 235 transmits or emits the generated infrared signal to the external electronic device 220.

The controller 236 controls the other components of the infrared transmission device 230.

In one embodiment, the determiner 233 may determine that the repeat event is maintained, when request data are stored in all the plurality of buffer cells in the buffer 232 after the infrared signal corresponding to the repeat event is transmitted. In this case, the infrared transmitter 235 may maintain the transmission of the infrared signal corresponding to the repeat event.

Additionally, in one embodiment, the determiner 233 may determine that the repeat event ends when no request data is stored in all the plurality of buffer cells in the buffer 232/when request data are not stored in all the plurality of buffer cells in the buffer 232 after the infrared signal corresponding to the repeat event is transmitted. In this case, the infrared transmitter 235 may end the transmission of the infrared signal corresponding to the repeat event.

The determiner 233 may determine that a press event rather than a repeat event occurs when no request data is stored in all the plurality of buffer cells included in the buffer 232/when request data are not stored in all the plurality of buffer cells included in the buffer 232. In this case, a process of processing a press event may be similar to the process of processing a repeat event, which is described with reference to FIG. 4(a).

Further, at least one of the determiner 233, the signal generator 234 and the controller 236 may be embodied as a module in a processor included in the infrared transmission device 230. The processor may include one or more of a central processing unit (CPU), an application processor and a communication processor. Additionally, the module may denote a functional and/or structural combination of hardware for executing the technical idea in the present disclosure and software for driving hardware. For example, the module may denote logical units of a predetermined code and a hardware resource for executing a predetermined code.

Hereafter, the infrared transmission device 230's operation of processing a repeat event is specifically described with reference to FIG. 7.

FIG. 7 is a flow chart showing a control method for the infrared transmission device 230 for processing a repeat event, in one embodiment.

Hereafter, each step is specifically described with reference to FIG. 7.

In step 702 (S702), the communicator 231 receives request data generated by the input device 240.

In this case, the display device 210 may receive the request data of the input device 240 and the communicator 231 may receive the request data transmitted by the display device 210, but not be limited. The input device 240 receive the request data directly.

In step 704 (S704), the buffer 232 stores the request data.

Further, the input device 240 may keep on inputting the request data, and the buffer 232 may keep on storing the input request data based on the FIFO method.

Suppose that a plurality of request data corresponding to a press event of a first repeat button, out of two or more repeat buttons included in the input device 240, is stored in the buffer 232.

In step 706 (S706), the determiner 233 determines whether a repeat event of/to the first repeat button occurs based on the amount of the request data stored in the buffer 232.

In one embodiment, the determiner 233 may determine that the repeat event of the first repeat button occurs, when request data corresponding to the press event of the first repeat button are stored in all the plurality of buffer cells in the buffer 232.

In an example, under the assumption that the input device 240 is an ordinary infrared-based remote controller and that the first repeat button is a volume-up button, the determiner 233 determines whether request data corresponding to a press event of the volume-up button are stored in all the plurality of buffer cells in the buffer 232. In this case, when the request data corresponding to the press event of the volume-up button are stored in all the plurality of buffer cells, the determiner 233 may determine that a repeat event of/to the volume-up button occurs.

In step 708 (S708), the signal generator 234 generates an infrared signal corresponding to the repeat event of the first repeat button when the repeat event of/to the first repeat button occurs.

In step 710 (S710), the infrared signal transmitter 235 transmits the generated infrared signal to the external electronic device 220.

In one embodiment, when the request data corresponding to the press event of the first repeat button are stored in all the plurality of buffer cells in the buffer 232 after the infrared signal corresponding to the repeat event of/to the first repeat button is transmitted, the determiner 233 may determine that the repeat event of/to the first repeat button is maintained. In this case, the infrared transmitter 235 may maintain the transmission of the infrared signal corresponding to the repeat event of/to the first repeat button.

Additionally, in one embodiment, when no request data corresponding to the press event of the first repeat button is stored in all the plurality of buffer cells in the buffer 232/the request data corresponding to the press event of the first repeat button are not stored in all the plurality of buffer cells in the buffer 232 after the infrared signal corresponding to the repeat event of/to the first repeat button is transmitted, the determiner 233 may determine that the repeat event of/to the first repeat button ends. In this case, the infrared transmitter 235 may end the transmission of the infrared signal corresponding to the repeat event of/to the first repeat button.

Further, when the repeat event of/to the first repeat button ends, the controller 236 may control the buffer 232 such that the request data stored in the buffer 232 are all deleted. Thus, a release event can be identified. In this case, the controller 236 may synchronize the time at which request data to be stored in the buffer 232 are input with the time at which the signal generator 234 starts to generate an infrared signal. After the synchronization, a new event can be processed.

FIG. 8 is a view showing the concept of the operation of processing a repeat event in one embodiment.

Referring to the upper drawing of FIG. 8, request data corresponding to a press event of the first repeat button are stored in all the plurality of buffer cells in the buffer 232. Accordingly, the determiner 233 may determine that a repeat event of/to the first repeat button occurs, the signal generator 234 may generate an infrared signal corresponding to the repeat event of/to the first repeat button, and the infrared transmitter 235 may transmit the generated infrared signal to the external electronic device 220.

Referring to the middle drawing of FIG. 8, the request data corresponding to the press event of the first repeat button are not stored in one of the plurality of buffer cells in the buffer 232. Accordingly, the determiner 233 determines that a release event of/to the first repeat button occurs, and the transmission of the infrared signal corresponding to the repeat event of/to the first repeat button ends.

Referring to the lower drawing of FIG. 8, when the repeat event of/to the first repeat button ends, the request data stored in the buffer 232 are all deleted, and the time at which request data to be stored in the buffer 232 are input synchronizes with the time at which the signal generator 234 starts to generate an infrared signal.

In summary, when an ordinary input device 240 is used instead of an exclusive remote controller, the key state (a normal state and/or a repeat state) of the input device is unknown, and a repeat event cannot be processed in the related art. Thus, the repeat event is processed in a way that a plurality of normal states is processed, thereby slowing down the processing operation. Alternatively, a program exclusive for processing a repeat event needs to be provided for each input device additionally.

However, the infrared transmission device 230 according to the present disclosure can process a repeat event, based on the above-described operation. In particular, even when various types of input devices are used, the infrared transmission device can process a repeat event accurately, and an additional exclusive software program is not be needed.

Further, the infrared transmission device 230 according to the present disclosure may be integrated with the display device 210. That is, the display device 210 may include the infrared transmission device 230. The display device 210 may receive request data generated by the input device 240, store the received request data in the buffer 232, determine whether a repeat event occurs, based on the amount of the request data stored in the buffer 232, generate an infrared signal corresponding to the repeat event when the repeat event occurs, and transmit the infrared signal to the external electronic device 220.

Although all the components of the embodiments in the present disclosure are described as being combined into one component or operating in combination, embodiments are not limited to the embodiments set forth herein, and one or more of all the components can be selectively combined to operate within the scope of the purpose of the disclosure. All the components can be respectively embodied as an independent hardware, or some or all of the components can be selectively combined and can be embodied as a computer program including a program module that performs some or all functions combined into one or more hardwares. Codes or code segments of the computer program can be easily inferred by one having ordinary skill in the art. The computer program can be stored in a computer-readable recording medium and can be read and executed by a computer, whereby the embodiments in the disclosure can be realized. Examples of a storage medium of the computer program include storage mediums including a magnetic recording medium, an optical recording medium and a semiconductor recording element. The computer program for realizing the embodiments in the disclosure includes a program module which is transmitted via an external device in real time.

The embodiments are described above with reference to a number of illustrative embodiments thereof. However, embodiments are not limited to the embodiments and drawings set forth herein, and numerous other modifications and embodiments can be devised by one skilled in the art. Further, the effects and predictable effects based on the configurations in the disclosure are to be included within the range of the disclosure though not explicitly described in the description of the embodiments.

The invention claimed is:

1. An infrared transmission device, comprising:
   a communicator receiving request data generated by an input device with a plurality of buttons; a buffer storing the request data;
   a control circuit configured to determine that a repeat event occurs, based on an amount of the request data stored in the buffer;
   a signal generator generating an infrared signal corresponding to the repeat event when the repeat event occurs; and
   an infrared transmitter transmitting the infrared signal to an external electronic device, wherein:
   the repeat event is an event in which a user continues to press a certain button, the plurality of buttons comprises two or more repeat buttons each configured to allow of a corresponding repeat operation,
   the buffer comprises a plurality of buffer cells,
   the control circuit determines that a repeat event of or to a first repeat button, out of the two or more repeat buttons, occurs only when request data corresponding to a press event of the first repeat button are stored in all the plurality of buffer cells, and
   the signal generator generates an infrared signal corresponding to the determined repeat event of or to the first repeat button.

2. The infrared transmission device of claim 1, wherein the control circuit determines that the repeat event is maintained when the request data are stored in all the plurality of buffer cells, after the infrared signal corresponding to the repeat event is transmitted, and the infrared transmitter maintains the transmission of the infrared signal corresponding to the repeat event.

3. The infrared transmission device of claim 1, wherein the control circuit determines that the repeat event ends when no request data is stored in all the plurality of buffer cells, after the infrared signal corresponding to the repeat event is transmitted, and
   the infrared transmitter ends the transmission of the infrared signal corresponding to the repeat event.

4. The infrared transmission device of claim 1, wherein the control circuit determines that the repeat event of or to the first repeat button is maintained, when the request data corresponding to the press event of the first repeat button are stored in all the plurality of buffer cells after the infrared signal corresponding to the repeat event of or to the first repeat button is transmitted, and
   the infrared transmitter maintains the transmission of the infrared signal corresponding to the repeat event of or to the first repeat button.

5. The infrared transmission device of claim 1, wherein the control circuit determines that the repeat event of or to the first repeat button ends, when no request data corresponding to the press event of the first repeat button is stored in all the plurality of buffer cells, after the infrared signal corresponding to the repeat event of or to the first repeat button is transmitted, and
   the infrared transmitter ends the transmission of the infrared signal corresponding to the repeat event of or to the first repeat button.

6. The infrared transmission device of claim 1, further, comprising:
   a controller controlling an operation of the buffer,
   wherein the controller controls the buffer such that the request data stored in the buffer are all deleted when the repeat event of or to the first repeat button ends.

7. The infrared transmission device of claim 6, wherein the controller synchronizes time at which request data to be stored in the buffer are input with time at which the signal generator starts to generate an infrared signal.

8. The infrared transmission device of claim 7, wherein a time interval at which the request data are input to the buffer on a regular basis is less than the signal generator's processing time for generating an infrared signal.

9. The infrared transmission device of claim 1, wherein the external electronic device is a device connecting to a display device, and
   the input device is a device for controlling an operation of at least a portion/at least one of the external electronic device and the display device.

10. The infrared transmission device of claim 9, wherein the display device receives request data of the input device, and
    the communicator receives the request data transmitted from the display device.

11. The infrared transmission device of claim 9, wherein the two or more repeat buttons is a physical button or a virtual button.

12. The infrared transmission device of claim 11, wherein the input device is a remote controller, and
    the two or more repeat buttons comprises at least two of a channel button, a volume button and four direction key buttons.

13. The infrared transmission device of claim 11, wherein the input device is a keyboard, and
    the two or more repeat buttons comprises four direction key buttons.

14. The infrared transmission device of claim 11, wherein the input device is a mouse, and
    the two or more repeat buttons comprises a wheel button, a left button and a right button.

15. A display device, comprising:
    a communicator receiving request data generated by an input device with a plurality of buttons; a buffer storing the request data;
    a control circuit determining that a repeat event occurs, based on an amount of the request data stored in the buffer;
    a signal generator generating an infrared signal corresponding to the repeat event when the repeat event occurs; and an infrared transmitter transmitting the infrared signal to an external electronic device, wherein:

the repeat event is an event in which a user continues to press a certain button, the plurality of buttons comprises two or more repeat buttons each configured to allow of a corresponding repeat operation, the buffer comprises a plurality of buffer cells, the control circuit determines that a repeat event of or to a first repeat button, out of the two or more repeat buttons, occurs only when request data corresponding to a press event of the first repeat button are stored in all the plurality of buffer cells, and the signal generator generates an infrared signal corresponding to the determined repeat event of or to the first repeat button.

16. A control method for an infrared transmission device, comprising:

receiving request data, generated by an input device with a plurality of buttons, by a communicator;

storing the request data by a buffer;

determining that a repeat event occurs by a control circuit, based on an amount of the request data stored in the buffer;

generating an infrared signal corresponding to the repeat event by a signal generator when the repeat event occurs; and transmitting the infrared signal by an infrared transmitter to an external electronic device, wherein:

the repeat event is an event in which a user continues to press a certain button, the plurality of buttons comprises two or more repeat buttons each configured to allow of a corresponding repeat operation, the buffer comprises a plurality of buffer cells, the control circuit determines that a repeat event of or to a first repeat button, out of the two or more repeat buttons, occurs only when request data corresponding to a press event of the first repeat button are stored in all the plurality of buffer cells, and the signal generator generates an infrared signal corresponding to the determined repeat event of or to the first repeat button.

\* \* \* \* \*